United States Patent [19]

Ong

[11] Patent Number: 5,175,703
[45] Date of Patent: Dec. 29, 1992

[54] HIGH SPEED FULL ADDER AND METHOD
[75] Inventor: Richard H. Ong, Phoenix, Ariz.
[73] Assignee: Motorola, Inc., Schaumburg, Ill.
[21] Appl. No.: 692,851
[22] Filed: Apr. 29, 1991
[51] Int. Cl.[5] .............................................. G06F 7/50
[52] U.S. Cl. .................................. 364/784; 364/786
[58] Field of Search ................................ 364/784, 786

[56] References Cited

U.S. PATENT DOCUMENTS

| | | | |
|---|---|---|---|
| 3,519,810 | 7/1970 | Priel et al. | 364/784 |
| 4,215,418 | 7/1980 | Muramatsu | 364/784 |
| 4,718,035 | 1/1988 | Hara et al. | 364/784 |
| 4,740,907 | 4/1988 | Shimizu et al. | 364/784 |
| 4,831,579 | 5/1989 | Hara et al. | 364/784 |
| 4,916,653 | 4/1990 | Shimizu et al. | 364/784 |
| 4,918,640 | 4/1990 | Heimsch et al. | 364/784 |

OTHER PUBLICATIONS

Menon et al, "A High Performance Parallel 16×16 Bit Bipolar Multiplier Using Standard Cell Design Methodology", IEEE 1987 Bipololar Circuits and Technology Meeting Sep. 21-22, 1987 Minneapolis, Minn. pp. 105-107.

Primary Examiner—David H. Malzahn
Attorney, Agent, or Firm—Jeffrey D. Nehr

[57] ABSTRACT

A high-speed current mode 2-bit full adder using ripple carry with two full adders using three-levels of series gating, a bandgap reference voltage generator, two sum out buffers, and a carry out buffer. The method for the addition of an input carry bit and two 2-bit input bytes uses a logic circuit satisfying Boolean expressions SUM=$ABC+AB'C'+A'B'C+A'BC'$ and $C_{OUT}=BC+AC+AB$, where first 2-bit input byte $A_1B_1$ and carry in byte $C_{IN}$ produce SUM equal to first bit sum $S_1$ and an intermediate carry out bit at two voltage levels, $C_2$, and $C_3$ to facilitate processing. Second 2-bit byte $A_2B_2$ and an intermediate carry out bit at $C_2$ and $C_3$, input to the bit 2 full adder, produce SUM equal to secondd bit sum $S_2$ and final carry out bit $C_{OUT}$. Each sum function uses only one current source to reduce components, lower power consumption, and improve efficiency.

18 Claims, 3 Drawing Sheets

HIGH SPEED FULL ADDER AND METHOD

CROSS-REFERENCE TO RELATED APPLICATIONS

This invention relates to co-pending U.S. patent application Ser. No. 678,375 from the same inventive entity, having the same assignee.

BACKGROUND OF THE INVENTION

This invention relates in general to the field of digital logic circuitry and, in particular, to current mode logic full adders.

Current mode logic allows soft saturation mode operation for fast response times. The collector-base junction may be allowed to be partially forward-biased. Even though the junction is forward biased, no minority carrier injection takes place (hard saturation implies injection). Therefore, no speed degradation occurs. Hard saturation conditions are not allowed and are eliminated by appropriately level shifting an input signal to a base of a transistor so that the collector-base junction is not fully forward biased.

A number of transistor connection structures can be employed as logical operators. An emitter follower can be used as voltage level shifter, as can a transistor with collector shorted to base providing a voltage level drop of a diode ("on" voltage). Two transistor collectors connected within a gate (i.e., a single current source circuit) can function as a logical "OR." Two transistor collectors connected across gates can function as a logical "AND."

Various arithmetic logic units, including current mode logic units, are known in the prior art. There are two basic schemes to handle multiple bit additions with carries. The first is a carry look ahead, which generates the carry output in parallel with the sum output of individual adders. The second is a ripple carry, which is a serial configuration in which the carry of the first bit is input to the second bit and is used for the calculation of the final carry out result. The second configuration is commonly used in high-performance multipliers.

Standard multi-bit adders are typically based on the carry look ahead scheme to maximize speed, i.e. to eliminate the propagation delays of ripple carry adders. The use of the carry look ahead configuration requires increased gate current and additional complexity in component number and size, however. Carry look ahead configurations also may require clamping diode action in controlling more than one current input to one logic level. For a sufficiently efficient design adding a small number of bits, the ripple carry can be less complex, be easier to fabricate, and require less power than the carry look ahead scheme, without sacrificing throughput.

SUMMARY OF THE INVENTION

A high-speed current mode 2-bit full adder is contemplated, with two full adders using three levels of series gating, a bandgap reference voltage generator to supply bias voltages, two sum out buffers, and a carry out buffer. The method for the addition of an input carry bit and two 2-bit input bytes each of the form A, B uses a ripple carry serial configuration logic circuit which satisfies the Boolean expressions SUM=ABC+AB'C'+A'B'C+A'BC', where X'=NOT X, and $C_{OUT}$=BC+AC+AB. The first 2-bit input byte $A_1$, $B_1$ and the carry in byte $C_{IN}$ operated on by the bit 1 adder produce SUM equal to a first bit sum $S_1$ and an intermediate carry out bit $C_{OUT}$ for the bit 2 full adder stage at two voltage levels, $C_2$, and $C_3$. The second 2-bit byte $A_2$, $B_2$ and the intermediate carry out bits $C_2$ and $C_3$ are input into the bit 2 full adder stage to produce SUM equal to a second bit sum $S_2$ and final carry out bit $C_{OUT}$. The intermediate carry bits $C_2$ and $C_3$ facilitate processing in the second adder, and the sum function in each full adder uses only one current source to reduce components, lower power consumption, and improve efficiency. The 2-bit adder can handle carry in and carry out in nanosecond propagation times. Full temperature and voltage compensation can be achieved with the appropriate bandgap reference voltage generator utilized to provide bias voltages for the full adders and sum and carry output buffers.

The above and other features and advantages of the present invention will be better understood from the following detailed description taken in conjunction with the accompanying drawings.

DETAILED DESCRIPTION OF THE PREFERRED EMBODIMENT

Figure 1:
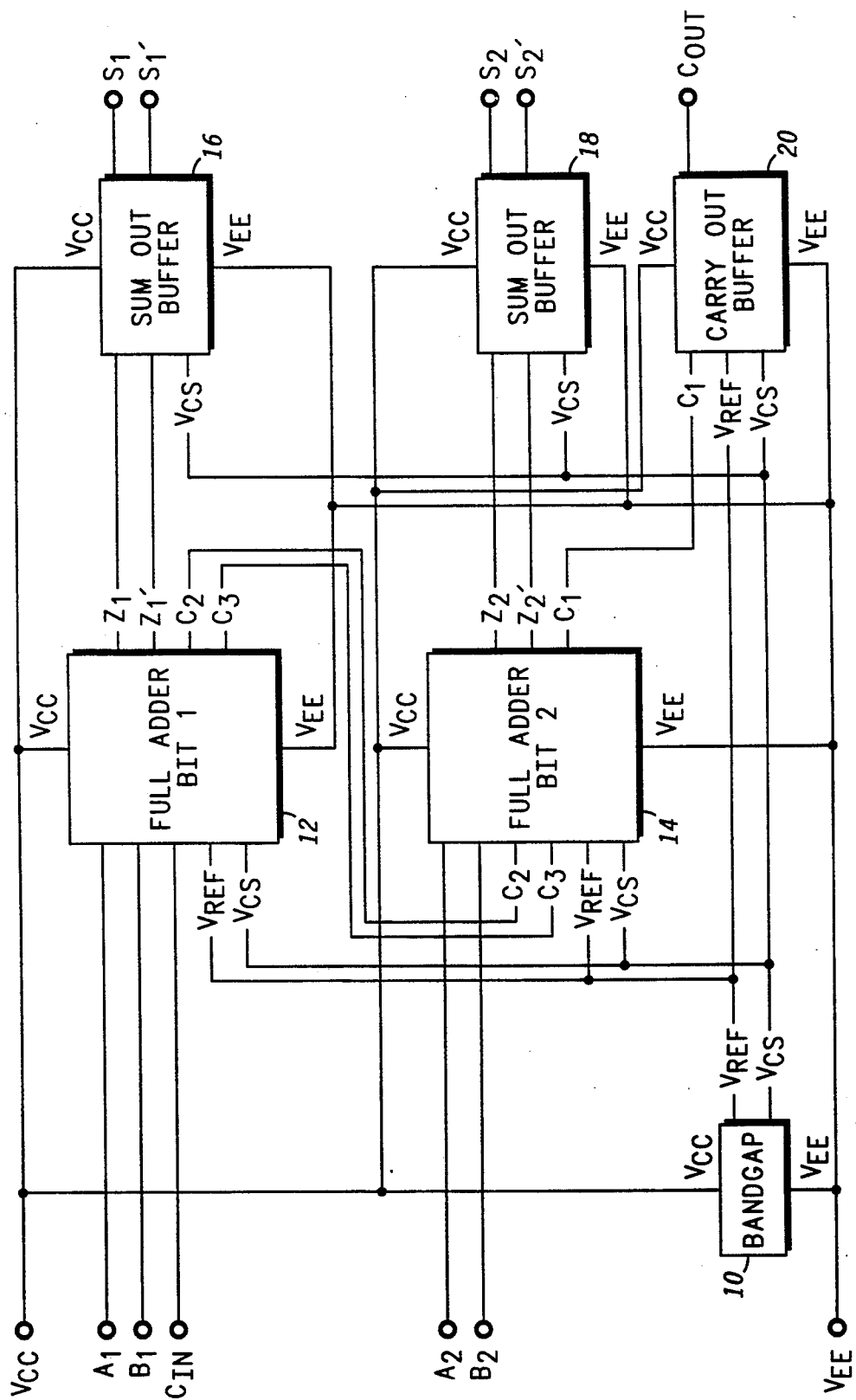
In FIG. 1, there is shown a circuit schematic of an implementation of a high-speed current mode three-level 2-bit full adder in accordance with a preferred embodiment of the invention.

In FIG. 1, there is shown a circuit schematic of an implementation of a high-speed current mode 2-bit full adder in accordance with a preferred embodiment of the present invention. The major components of the 2-bit full adder are bandgap 10, bit 1 full adder 12, bit 2 full adder 14, bit 1 sum out buffer 16, bit 2 sum out buffer 18, and carry out buffer 20.

Bandgap 10 provides $V_{CC}$, a supply voltage (ground), $V_{EE}$, a negative supply voltage, $V_{CS}$, a bias voltage for the current source, and $V_{REF}$, a threshold reference voltage. All four voltages are provided to bit 1 full adder 12, bit 2 full adder 14, and carry out buffer 20. Voltages $V_{CC}$, $V_{CS}$, and $V_{EE}$ are supplied to bit 1 sum out buffer 16 and bit 2 sum out buffer 18 by bandgap 10.

Inputs to the 2-bit full adder are $A_1$, $B_1$, and $C_{IN}$, representing a 2-bit byte and carry in byte, respectively, as well as $A_2$ and $B_2$, representing a second 2-bit byte. $A_1$, $B_1$, and $C_{IN}$ are input to the bit 1 full adder 12. $A_2$ and $B_2$ are input into the bit 2 full adder 14.

Bit 1 full adder 12 logically adds inputs $A_1$, $B_1$, and $C_{IN}$ in accordance with the following Boolean logic expressions:

$$SUM = ABC + AB'C' + A'B'C + A'BC' \text{ and}$$
$$C_{OUT} = BC + AC + AB,$$

where $A=A_1$, $B=B_1$, $C=C_{IN}$, and where SUM produced by bit 1 adder is designated $Z_1$, with two representations of the bit 1 full adder carry out bit, $C_{OUT}$, produced as $C_2$ and $C_3$ (two differing voltage levels). The logical "NOT $Z_1$"=$Z_1'$ is also output by bit 1 full adder 12.

$Z_1$ and $Z_1'$ form a reduced voltage swing differential signal pair and are input into bit 1 sum out buffer 16. Bit 1 sum out buffer 16, appropriately supplied with $V_{CC}$, $V_{CS}$, and $V_{EE}$ from bandgap 10, produces the first sum bit output of the 2-bit full adder and its complement, i.e., $S_1$ and $S_1'$. The two different voltage levels of $C_{OUT}$ from the bit 1 adder, i.e., $C_2$ and $C_3$, are input into bit 2 full adder 14, facilitating bit 2 processing by eliminating voltage stepping of $C_{OUT}$ within bit 2 full adder 14.

Inputs to bit 2 full adder 14 are $A_2$, $B_2$, $C_2$, and $C_3$. Appropriately supplied by bandgap 10 with $V_{CC}$, $V_{EE}$, $V_{CS}$, and $V_{REF}$, bit 2 full adder 14 logically adds inputs $A_2$, $B_2$, $C_2$, and $C_3$ in accordance with the same Boolean logic expressions as embodied in bit 1 full adder 12 (as described above). In calculating the bit 2 full adder SUM = $S_2$, A = $A_2$, B = $B_2$, and C = $C_2$ or $C_3$, depending on the voltage level at which the logical operation is taking place. For example, C = $C_2$ at the second level as described below, and C = $C_3$ at the third level as described below.

Outputs from bit 2 full adder 14 are the SUM for the second bit, $Z_2$, $Z_2'$, and carry bit $C_1$. $Z_2$ and $Z_2'$ are input into bit 2 sum out buffer 18. Bit 2 sum out buffer 18, appropriately supplied with $V_{CC}$, $V_{CS}$, and $V_{EE}$ from bandgap 10, produces the second sum bit outputs of the 2-bit full adder, $S_2$, and $S_2'$. Carry bit $C_1$ is input into carry out buffer 20. Appropriately supplied with $V_{CC}$, $V_{CS}$, and $V_{EE}$ from bandgap 10, carry out buffer 20 produces the 2-bit full adder carry out bit, $C_{OUT}$.

Figure 2:
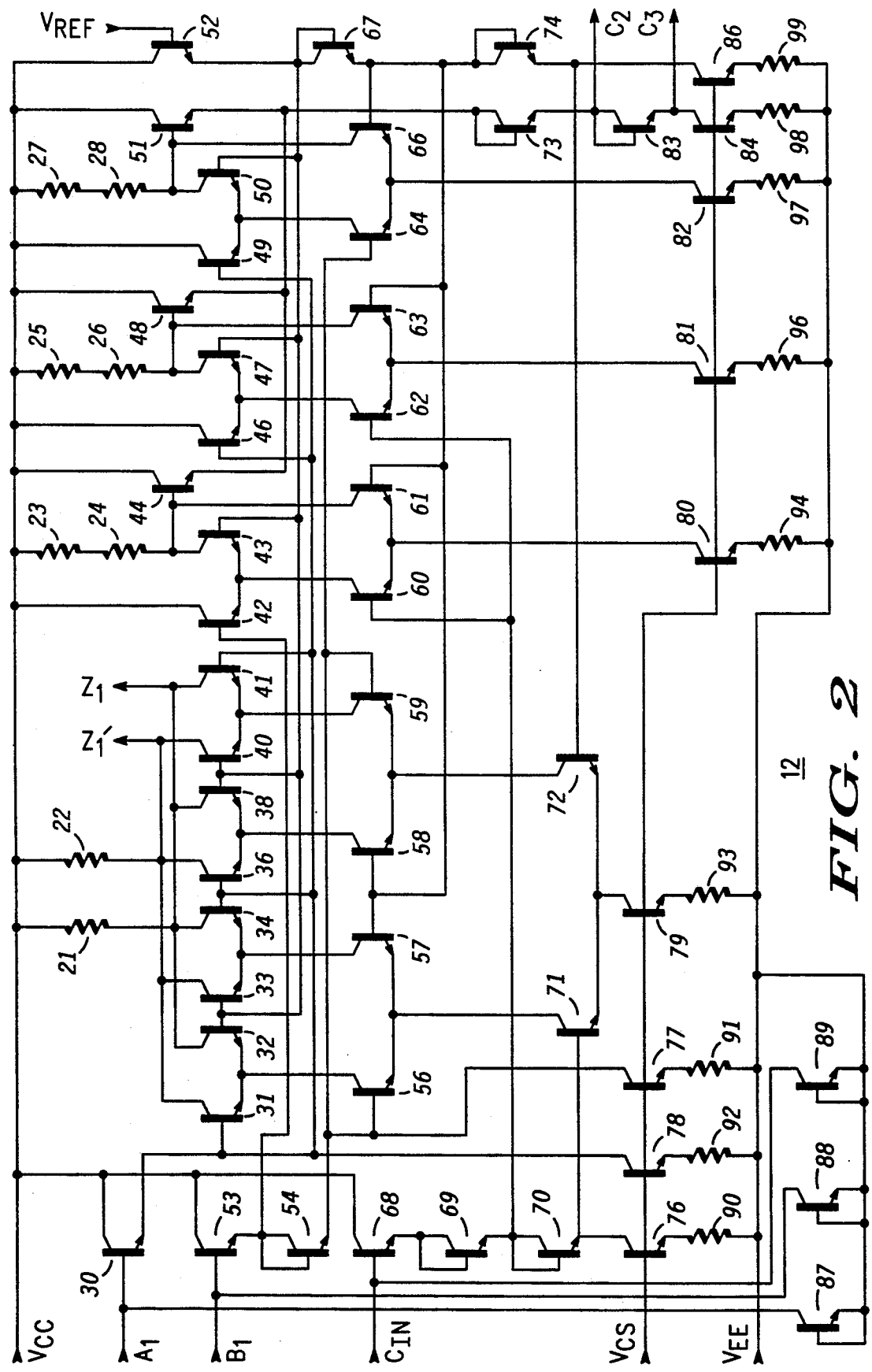
In FIG. 2, there is shown a circuit schematic of the bit 1 full adder shown in FIG. 1.

FIG. 2 shows a circuit schematic of the bit 1 full adder 12 shown in FIG. 1. Transistor 79 forms the current source (gate) for the sum function within bit 1 full adder 12. Transistors 31, 32, 33, 34, 36, 38, 40 and 41 comprise a first level logical sum operation, with transistors 31 and 32, transistors 33 and 34, transistors 36 and 38, and transistors 40 and 41 forming four distinct differential pairs. Transistors 56, 57, 58, and 59 comprise a second level logical sum operation, with transistors 56 and 57 and transistors 58 and 59 forming two distinct differential pairs. Transistors 71 and 72 comprise a third level logical sum operation and form a differential pair.

The negative supply voltage $V_{EE}$ is connected through resistor 92 to the emitter of transistor 78, through resistor 91 to the emitter of transistor 77, and through resistor 90 to the emitter of transistor 76. Voltage $V_{EE}$ is also coupled through resistor 93 to the emitter of transistor 79 (the bit 1 adder sum current source).

Bias voltage $V_{CS}$ is coupled to the bases of transistors 76, 77, 78, and 79.

Supply voltage $V_{CC}$ is coupled through resistor 21 to the collector of transistor 34, through resistor 22 to the collector of transistor 36, and to the collector of transistor 30, the collector of transistor 53, and the collector of transistor 68.

Bias voltage $V_{REF}$ is coupled to the base of transistor 52. The bases of transistors 32, 33, 38, and 40 are all driven by the emitter of transistor 52, providing $V_{REF}$ in an emitter follower fashion. The bases of transistors 31, 34, 36, and 41 are all driven by the emitter of transistor 30.

Inputs are $A_1$ to the base of transistor 30 and to the collector of transistor 87, $B_1$ to the base of transistor 53 and the collector of transistor 88, and $C_{IN}$ to the base of transistor 68 and the collector of transistor 89. Transistor 87 is base-emitter shorted, and the emitter of transistor 87 is coupled to voltage $V_{EE}$. Transistor 88 is base-emitter shorted, and the emitter of transistor 88 is coupled to voltage $V_{EE}$. Transistor 89 is base-emitter shorted, and the emitter of transistor 89 is coupled to voltage $V_{EE}$. Transistors 87, 88, and 89 are used for input electrostatic discharge (ESD) protection. $A_1$ is processed logically at only the first level, in emitter follower fashion from the emitter of transistor 30.

$B_1$ is processed at the second level in the bit 1 sum, so from the emitter of transistor 53 is input into the collector of transistor 54. Transistor 54 has base shorted to collector, and therefore functions to diode drop the $B_1$ voltage to a value suitable for level two. The $B_1$ voltage which has been diode-dropped once (i.e., at the emitter of transistor 54) is input to the base of transistors 56 and 59.

$C_{IN}$, which is processed at the third level, is dropped twice in voltage from the emitter of transistor 68 before input into the base of transistor 71. The emitter of transistor 68 is coupled to the collector of base-collector shorted transistor 69. The emitter of transistor 69 is coupled to the collector of base-collector shorted transistor 70. The emitter of transistor 70 is connected to the base of transistor 71. The two diode drops adjust $C_{IN}$ to the proper level for processing in the third level of the bit 1 adder.

$V_{REF}$ must be diode-dropped to provide an appropriate $V_{REF}$ for level two, and twice diode dropped to provide an appropriate $V_{REF}$ for level three. From the emitter of transistor 52, $V_{REF}$ is connected through base-collector shorted transistor 67, with the emitter of transistor 67 coupled to the bases of transistors 66, 63, 61, 58 and 57. The emitter of transistor 67 is coupled to the collector of base-collector shorted transistor 74. The emitter of transistor 74 is coupled to and provides twice diode-dropped $V_{REF}$ for the base of transistor 72.

Starting with the bit 1 sum current source (i.e., transistor 79), the collector of transistor 79 couples to the coupled emitters of transistors 71 and 72. The collector of transistor 71 is connected to the coupled emitters of transistors 56 and 57. The collector of transistor 72 is connected to the coupled emitters of transistors 58 and 59. The collector of transistor 56 is connected to the coupled emitters of transistors 31 and 32. The collector of transistor 57 is connected to the coupled emitters of transistors 33 and 34. The collector of transistor 58 is connected to the coupled emitters of transistors 36 and 38. The collector of transistor 59 is connected to the coupled emitters of transistors 40 and 41.

The collector of transistor 76 is coupled to the emitter of transistor 70. The collector of transistor 77 is coupled to the emitter of transistor 54. The collector of transistor 78 is coupled to the emitter of transistor 30.

The collectors of transistors 32, 34, 38, and 41 are coupled together to form output $Z_1$. The collectors of transistors 31, 33, 36, and 40 are coupled together to form output $Z_1'$.

The SUM for $Z_1$ is created by a combination of four circuit paths corresponding to the logical "OR" of the possibilities ABC, AB'C', A'B'C, and A'BC'. $C_{IN}$ is input (at the appropriate third level) to the base of transistor 71, so the collector of transistor 72 is also logically $C_{IN}$ and the collector of transistor 71 is $C_{IN}'$. Similarly, the base of transistor 56 is the second level $B_1$, so the collector of transistor 57 is logically $B_1$ and the collector of transistor 56 is $B_1'$. The base of transistor 59 is also the second level $B_1$, so the collector of transistor 58 is logically $B_1$ and the collector of transistor 59 is $B_1'$. In the first level, input $A_1$ occurs to the bases of transistors 31, 34, 36, and 41, so the collectors of transistors 32, 33, 38, and 40 are logically $A_1$, and the collectors of transistors 31, 34, 36, and 40 are $A_1'$.

Thus, the combination ABC is represented by the path of current from the current source 79 through transistor 72, through transistor 58, through transistor 38 to output $Z_1$. The combination AB'C' is represented by the path from the current source in transistor 79 through transistor 71, through transistor 56, through transistor 31 to output $Z_1$. The combination A'B'C is represented by the path from the current source in transistor 79 through transistor 72, through transistor 59, through transistor 41 to output $Z_1$. Finally, the combination A'BC' is represented by the path from the current source in transistor 79 through transistor 71, through transistor 57, through transistor 32 to output $Z_1$. Since all combinations ABC, AB'C', A'B'C, and A'BC' are within a single gate with output $Z_1$, $Z_1 = SUM = ABC + AB'C' + A'B'C + A'BC'$.

FIG. 2 also shows a circuit schematic of the carry function of the bit 1 full adder 12 shown in FIG. 1. Transistors 80, 81, and 82 form the three current sources (gates) used for the carry function in the bit 1 full adder 12. Transistors 42, 43, 44, 46, 47, 48, 49, 50, and 51 comprise a first level operation, with transistors 42 and 43, transistors 46 and 47, and transistors 49 and 50 forming three distinct differential pairs. Transistors 60, 61, 62, 63, 64, and 66 comprise a second level operation, with transistors 60 and 61, 62 and 63, and transistors 64 and 66 forming three distinct differential pairs. The emitter of transistor 83 represents a third level.

Voltage $V_{EE}$ is coupled through resistor 94 to the emitter of transistor 80, through resistor 96 to the emitter of transistor 81, through resistor 97 to the emitter of resistor 82, through resistor 98 to the emitter of transistor 84 and through resistor 99 to the emitter of transistor 86.

Voltage $V_{CC}$ is coupled through the series combination of resistors 23 and 24 to the collector of transistor 43, through the series combination of resistors 25 and 26 to the collector of transistor 47, and through the series combination of resistors 27 and 28 to the collector of transistor 50. $V_{CC}$ is also coupled to the collectors of transistors 42, 44, 46, 48, 49, 51, and 52.

Voltage $V_{CS}$ drives the bases of transistors 80, 81, 82, 84, and 86.

$V_{REF}$ at level one is provided from the emitter of transistor 52 to the bases of transistors 50, 47, and 43. $V_{REF}$ is diode-dropped in transistor 67 to provide an appropriate $V_{REF}$ for level two, and twice diode dropped, in transistors 67 and 74, to provide an appropriate $V_{REF}$ for level three. From the emitter of transistor 52, $V_{REF}$ is connected to the collector of base-collector shorted transistor 67, with the emitter of transistor 67 coupled to the bases of transistors 66, 63, 61, 58 and 57. The emitter of transistor 67 is coupled to the collector of base-collector shorted transistor 74. The emitter of transistor 74 is coupled to the base of transistor 72 to provide twice diode-dropped $V_{REF}$.

Starting with the bit 1 first carry current source (i.e., transistor 80), the collector of transistor 80 couples to the coupled emitters of transistors 60 and 61. The collector of transistor 60 is connected to the coupled emitters of transistors 42 and 43. The collector of transistor 61 is coupled to the base of transistor 44 and collector of transistor 43.

Starting with the bit 1 second carry current source (i.e., transistor 81), the collector of transistor 81 couples to the coupled emitters of transistors 62 and 63. The collector of transistor 62 is connected to the coupled emitters of transistors 46 and 47. The collector of transistor 63 is connected to the base of transistor 48 and the collector of transistor 47.

Starting with the bit 1 third carry current source (i.e., transistor 82), the collector of transistor 82 couples to the coupled emitters of transistors 64 and 66. The collector of transistor 64 is connected to the coupled emitters of transistors 49 and 50. The collector of transistor 66 is connected to the base of transistor 51 and the collector of transistor 50.

Inputs of $A_1$ occur to the bases of transistors 46 and 49. An input of first level $B_1$ occurs to the base of transistor 42. An input of second level $B_1$ occurs to the base of transistor 64 from the emitter of transistor 54. Inputs of $C_{IN}$ occur at the bases of transistors 60 and 62 from the emitter of transistor 69.

The emitters of transistors 44, 48, and 51 are coupled together and to the collector of base-collector shorted transistor 73 to form output $C_2$ at the emitter of transistor 73. The emitter of transistor 73 is coupled to the collector of base-collector shorted transistor 83 to form output $C_3$ at the emitter of transistor 83.

Because the bases of transistors 60 and 62 have $C_{IN}$ input, the collectors of transistors 60 and 62 are logically $C_{IN}'$ and the collectors of the differential pair counterparts to transistors 60 and 62, i.e., transistors 61 and 63, are logically $C_{IN}$. Similarly, the base of transistor 64 has $B_1$ as input, resulting in the collector of transistor 66 logically $B_1$ and the collector of transistor 64 logically $B_1'$.

At the first level, the base of transistor 42 is input with $B_1$, making the base of transistor 44 the combination $B_1C_{IN}' + C_{IN}$, which reduces to $B_1C_{IN}$. Similarly, the base of transistor 46 is input with $A_1$, making the base of transistor 48 the combination $A_1C_{IN}' + C_{IN}$, which reduces to $A_1C_{IN}$. Finally, the base of transistor 49 is input with $A_1$, making the base of transistor 51 the combination $A_1B_1' + B$, which reduces to $A_1B_1$. After the base to emitter voltage drops through transistors 44, 48, and 51 for $B_1C_{IN}$, $A_1C_{IN}$, and $A_1B_1$, respectively, the emitter of transistor 73 represents $C = BC_{IN} + AC_{IN} + AB$. Dropping the voltage through base-collector shorted transistor 73, C becomes $C_2$, the second voltage level version of the intermediate carry out bit. After another voltage drop through base-collector shorted transistor 83, $C_2$ becomes $C_3$, the third voltage level version of the intermediate carry out bit.

Figure 3:
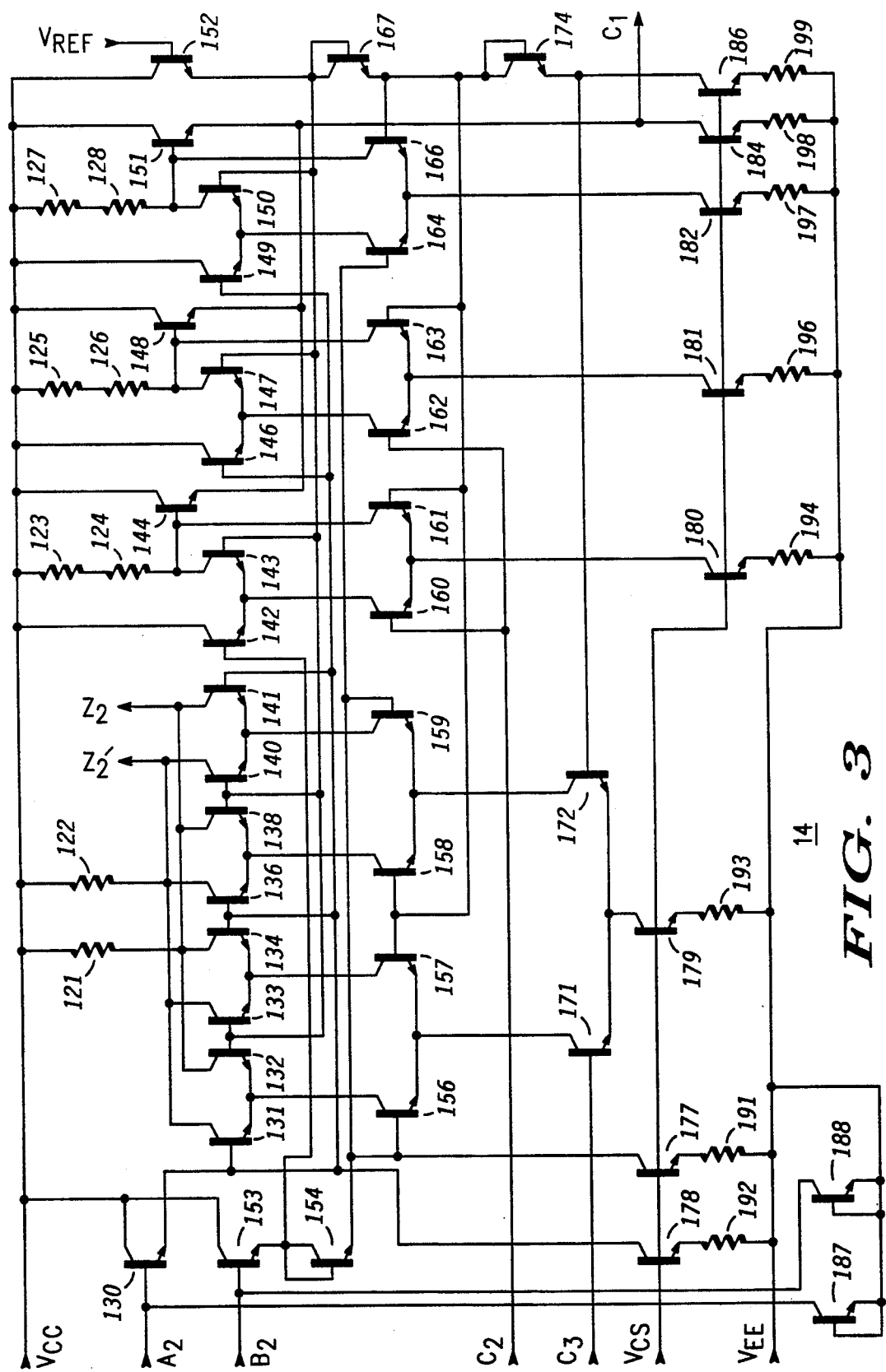
In FIG. 3, there is shown a circuit schematic of the bit 2 full adder shown in FIG. 1.

In FIG. 3, there is shown a circuit schematic of the bit 2 full adder 14 shown in FIG. 1. In both structure and function, it is identical to the bit 1 full adder in FIG. 2, except that the two-level versions of the intermediate carry out bit from the bit 1 adder can be input directly at the appropriate level, without voltage stepping of the carry in bit. Thus, $C_2$ is input into the bases of transistors 160 and 162, and $C_3$ is input directly into the base of transistor 171. The only other structure difference between FIGS. 2 and 3 is that the transistor analogous to transistor 89 in FIG. 2 is not required. The FIG. 3 numerical references of components correspond to those in FIG. 2 if 100 is subtracted from the reference numbers. The description of the bit 2 full adder is thus identical to the description of the bit 1 full adder in FIG. 2, except that the output sum is $Z_2$, its output complement is $Z_2'$ and only one level of a final carry out bit is produced, i.e., $C_1$.

Thus, a high speed full adder and method has been described which overcomes specific problems and accomplishes certain advantages relative to prior art methods and mechanisms. The improvements over known technology are significant. The 2-bit full adder comprises two full adders which each use only one current source in a sum function. The first bit full adder additionally generates intermediate carry bits at two distinct voltage levels to facilitate addition in the sum stage of the second full adder. Increased reliability from fewer components with lower overall power consumption results. The 2-bit adder can handle carry in and carry out in nanosecond propagation times. Full temperature and voltage compensation can be achieved with the appropriate bandgap reference voltage generator utilized to provide supply and bias voltages for the full adders and sum and carry output buffers.

Thus, there has also been provided, in accordance with an embodiment of the invention, a high speed full adder and method that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

I claim:

1. A high-speed current mode logic 2-bit full adder with three level voltage logic and series gating comprising:
   first full adder means for receiving inputs $A_1$, $B_1$, and carry in bit $C_{IN}$ and for producing a first-level output byte $Z_1$ in accordance with the Boolean logic expression $Z_1 = A_1B_1C_{IN} + A_1B_1'C_{IN}' + A_1'B_1'C_{IN} + A_1'B_1C_{IN}'$;
   second full adder means coupled to the first full adder means, the second full adder means for receiving inputs $A_2$, $B_2$, $C_2$, and $C_3$ and for producing a second output $Z_2$ in accordance with the Boolean logic expression:
   $Z_2 = A_2B_2C + A_2B_2'C' + A_2'B_2'C + A_2'B_2C'$, where $C = C_2$ at a second voltage level and $C = C_3$ at a third voltage level;
   bandgap reference voltage generator means to supply a plurality of supply voltages coupled to the first full adder means via a first plurality of connections and to the second full adder means via a second plurality of connections;
   first sum out buffer means coupled to the first full adder means and to the bandgap reference voltage generator means via a third plurality of connections;
   second sum out buffer means coupled to the second full adder means and to the bandgap reference voltage generator means via a fourth plurality of connections; and
   carry out buffer means coupled to the second full adder means and to the bandgap reference voltage generator means via a fifth plurality of connections.

2. A 2-bit full adder as claimed in claim 1, wherein the first full adder means further comprises:
   first adder sum means for producing $Z_1$, the first adder sum means coupled to the first voltage $V_{CC}$, the second voltage $V_{REF}$, the third voltage $V_{CS}$, and the fourth voltage $V_{EE}$; and
   first adder carry means for producing an output byte $C_{OUT}$ at a second voltage logic level $C_2$ and a third voltage logic level $C_3$ in accordance with the Boolean logic expression $C_{OUT} = B_1C_{IN} + A_1C_{IN} + A_1B_1$, the first adder carry means coupled to the first adder sum means, to the first voltage $V_{CC}$, to the second voltage $V_{REF}$, to the third voltage $V_{CS}$, and to the fourth voltage $V_{EE}$.

3. A 2-bit full adder as claimed in claim 2, wherein the first adder sum means comprises:
   means for first adder summing of first voltage level logic coupled to the first voltage $V_{CC}$ and to the second voltage $V_{REF}$;
   means for first adder summing of second voltage level logic coupled to the means for first adder summing of first voltage level logic;
   means for first adder summing of third level voltage logic coupled to the means for first adder summing of second level voltage logic; and
   first adder sum means for supplying current coupled to the means for first adder summing of third level voltage logic, to the third voltage $V_{CS}$, and to the fourth voltage $V_{EE}$.

4. A 2-bit full adder as claimed in claim 2, wherein the first adder carry means comprises:
   means for first adder carrying of first voltage level logic coupled to the means for first adder summing of first voltage level logic, to the first voltage $V_{CC}$, and to the second voltage $V_{REF}$;
   means for first adder carrying of second voltage level logic coupled to the means for first adder carrying of first voltage level logic and to the means for first adder summing of second voltage level logic;
   means for first adder carrying of third voltage level logic coupled to the means for first adder carrying of second voltage level logic and to the means for first adder summing of third voltage level logic;
   first adder carry means for supplying current coupled to the means for first adder carrying of third level voltage logic, to the means for first adder carrying of second voltage level logic, to the first adder sum means for supplying current, to the third voltage $V_{CS}$, and to the fourth voltage $V_{EE}$.

5. A 2-bit full adder as claimed in claim 4 wherein the second full adder means is coupled to the first voltage $V_{CC}$, to the second voltage $V_{REF}$, to the third voltage $V_{CS}$, and to the fourth voltage $V_{EE}$, and the second full adder means comprises:
   second adder sum means for producing $Z_1$, the second adder sum means coupled to the first voltage $V_{CC}$, to the second voltage $V_{REF}$, to the third voltage $V_{CS}$, and to the fourth voltage $V_{EE}$; and
   second adder carry means for producing a second carry bit $C_1$, the second adder carry means coupled to the second adder sum means, to the first voltage $V_{CC}$, to the second voltage $V_{REF}$, to the third voltage $V_{CS}$, and to the fourth voltage $V_{EE}$.

6. A 2-bit full adder as claimed in claim 5, wherein the second adder sum means comprises:
   means for second adder summing of first voltage level logic coupled to the first voltage $V_{CC}$ and to the second voltage $V_{REF}$;
   means for second adder summing of second voltage level logic coupled to the means for second adder summing of first voltage level logic and to the second adder input means;
   means for second adder summing of third level voltage logic coupled to the means for second adder summing of second level voltage logic; and
   second adder sum means for supplying current coupled to the means for second adder summing of third level voltage logic, to the third voltage $V_{CS}$, and to the fourth voltage $V_{EE}$.

7. A 2-bit full adder as claimed in claim 6, wherein the second adder carry means comprises:

means for second adder carrying of first voltage level logic coupled to the means for second adder summing of first voltage level logic, to the first voltage $V_{CC}$, and to the second voltage $V_{REF}$;

means for second adder carrying of second voltage level logic coupled to the means for second adder carrying of first voltage level logic and to the means for second adder summing of second voltage level logic;

means for second adder carrying of third voltage level logic coupled to the means for second adder carrying of second voltage level logic and to the means for second adder summing of third voltage level logic;

second adder carry means for supplying current coupled to the means for second adder carrying of third level voltage logic, to the means for second adder carrying of second voltage level logic, to the second adder sum means for supplying current, to the third voltage $V_{CS}$, and to the fourth $V_{EE}$.

8. A 2-bit full adder as claimed in claim 7 wherein the bandgap reference voltage generator means comprises:

a first voltage output $V_{CC}$ producing the first voltage $V_{CC}$;

a second voltage output $V_{REF}$ producing the second voltage $V_{REF}$;

a third voltage output $V_{CS}$ producing the third voltage $V_{CS}$; and a fourth voltage output $V_{EE}$ producing the fourth voltage $V_{EE}$.

9. A 2-bit full adder as claimed in claim 7 wherein the first sum out buffer means is coupled to the first voltage $V_{CC}$, the second voltage $V_{REF}$, the third voltage $V_{CS}$, and the fourth voltage $V_{EE}$, and the first sum out buffer means comprises:

means for receiving the output byte $Z_1$ and the output byte $Z_1'$; and means for producing an output byte $S_1$ and a second sum output byte $S_1'$ in response to the means for receiving the output byte $Z_1$ and the output byte $Z_1'$.

10. A 2-bit full adder as claimed in claim 7 wherein the second sum out buffer means is coupled to the first voltage $V_{CC}$, the second voltage $V_{REF}$, the third voltage $V_{CS}$, and the fourth voltage $V_{EE}$, and the second sum out buffer means comprises:

means for receiving the output byte $Z_2$ and the output byte $Z_2'$; and means for producing an output byte $S_2$ and an output byte $S_2'$ in response to the means for receiving the output byte $Z_2$ and the output byte $Z_2'$.

11. A 2-bit full adder as claimed in claim 7 wherein the carry out buffer means is coupled to the first voltage $V_{CC}$, the second voltage $V_{REF}$, the third voltage $V_{CS}$, and the fourth voltage $V_{EE}$, and the carry out buffer means comprises:

means for receiving the carry output byte $C_1$; and means for producing an output byte $C_{OUT}$ in response to the means for receiving the carry output byte $C_1$.

12. A soft-saturation current mode arithmetic logic unit, using voltages $V_{CC}$, $V_{CS}$, $V_{EE}$, and $V_{REF}$, operating on inputs A, B and C to produce a sum bit, S, and a carry out bit, $C_{OUT}$, in accordance with the Boolean logic expressions:

$S = ABC + AB'C' + A'B'C + A'BC'$ and $C_{OUT} = BC + AC + AB$, where $X' = $ NOT $X$, the arithmetic logic unit comprising:

sum logic means comprising a first sum operator, a second sum operator coupled to the first sum operator, and a third sum operator coupled to the second sum operator, the sum logic means to produce a sum bit; and carry logic means comprising a first carry operator coupled to the first sum operator, a second carry operator coupled to the first carry operator and to the second sum operator, and a third carry operator coupled to the third sum operator and to the second carry operator, the carry logic means to produce $C_{OUT}$ at two output levels, $C_2$ and $C_3$.

13. An arithmetic logic unit as in claim 12, wherein the first sum operator comprises:

a first differential pair of transistors comprising a first transistor and a second transistor;

a second differential pair of transistors comprising a third transistor and a fourth transistor;

a third differential pair of transistors comprising a fifth transistor and a sixth transistor;

a fourth differential pair of transistors comprising a seventh transistor and an eighth transistor;

a base of each of the first, fourth, fifth, and eighth transistors coupled to the input A;

a base of each of the second, third, sixth, and seventh transistors connected to the voltage $V_{REF}$;

a collector of each of the first, third, fifth, and seventh transistors connected to an intermediate output $Z_1$ and to the voltage $V_{CC}$;

a collector of each of the second, fourth, sixth, and eighth transistors connected to an output $Z_1'$;

an emitter of each of the first and second transistors coupled together;

an emitter of each of the third and fourth transistors coupled together;

an emitter of each of fifth and sixth transistors coupled together; and an emitter of each of the seventh and eighth transistors coupled together.

14. An arithmetic logic unit as in claim 13, wherein the second sum operator comprises:

a fifth differential pair of transistors comprising a ninth transistor and tenth transistor;

a sixth differential pair of transistors comprising an eleventh transistor and a twelfth transistor;

a base of each of the ninth and twelfth transistors coupled to the input B;

a base of each of the tenth and eleventh transistors connected to the voltage $V_{REF}$;

a collector of the ninth transistor connected to the coupled emitters of the first and second transistors;

a collector of the tenth transistor connected to the coupled emitters of the third and fourth transistors;

a collector of the eleventh transistor connected to the coupled emitters of the fifth and sixth transistors;

a collector of the twelfth transistor connected to the coupled emitters of the seventh and eighth transistors;

an emitter of each of the ninth and tenth transistors coupled together; and an emitter of each of the eleventh and twelfth transistors coupled together.

15. An arithmetic logic unit as in claim 14, wherein the third sum operator comprises:

a seventh differential pair of transistors comprising a thirteenth transistor and fourteenth transistor;
a base of the thirteenth transistor coupled to the input C;
a base of the fourteenth transistor connected to the voltage $V_{REF}$;
a collector of the thirteenth transistor connected to the coupled emitters of the ninth and tenth transistors;
a collector of the fourteenth transistor connected to the coupled emitters of the eleventh and twelfth transistors;
an emitter of each of the thirteenth and fourteenth transistors coupled together; and
a first bit sum current source coupled to the coupled emitters of the thirteenth and fourteenth transistors, to the voltage $V_{EE}$ and to the voltage $V_{CS}$.

16. An arithmetic logic unit as in claim 15, wherein the first carry operator comprises:
an eighth differential pair of transistors comprising a fifteenth transistor and a sixteenth transistor;
a ninth differential pair of transistors comprising a seventeenth transistor and an eighteenth transistor;
a tenth differential pair of transistors comprising a nineteenth transistor and a twentieth transistor;
a base of each of the seventeenth and nineteenth transistors coupled to the input A;
a base of each of the sixteenth, eighteenth, and twentieth transistors connected to the voltage $V_{REF}$;
a base of the fifteenth transistor coupled to the input B;
a collector of each of the fifteenth, sixteenth, seventeenth, eighteenth, nineteenth, and twentieth transistors all coupled to the voltage $V_{CC}$;
an emitter of each of the fifteenth and sixteenth transistors coupled together;
an emitter of each of the seventeenth and eighteenth transistors coupled together; and
an emitter of each of the nineteenth and twentieth transistors coupled together.

17. An arithmetic logic unit as in claim 16, wherein the second carry operator means produces an intermediate output AB, an intermediate output BC, and an intermediate output AC, the second carry operator comprising:
an eleventh differential pair of transistors comprising a twenty-first transistor and a twenty-second transistor;
a twelfth differential pair of transistors comprising a twenty-third transistor and a twenty-fourth transistor;
a thirteenth differential pair of transistors comprising a twenty-fifth transistor and a twenty-sixth transistor;
a base of each of the twenty-first and twenty-third transistors coupled to the input $B_1$;
a base of each of the twenty-second and twenty-fourth transistors connected to the voltage $V_{REF}$;
a base of the twenty-fifth transistor coupled to the input B;
a collector of the twenty-first transistor connected to the coupled emitters of the fifteenth and sixteenth transistors;
a collector of the twenty-third transistor connected to the coupled emitters of the seventeenth and eighteenth transistors;
a collector of the twenty-fifth transistor connected to the coupled emitters of the nineteenth and twentieth transistors.

18. An arithmetic logic unit as in claim 17, wherein the third carry opertor produces an intermediate output $C_2 = AB + AC + BC$ and an intermediate output $C_3 = AB + AC + BC$ at a reduced voltage level and the third carry operator comprises:
a carry first current source coupled to the coupled emitters of the twenty-first and twenty-second transistors, to the voltage $V_{EE}$ and to the voltage $V_{CS}$;
a carry second current source coupled to the coupled emitters of the twenty-third and twenty-fourth transistors and to the voltage $V_{EE}$ and to the voltage $V_{CS}$; and
a carry third current source coupled to the coupled emitters of the twenty-fifth and twenty-sixth transistors and to the voltage $V_{EE}$ and to the voltage $V_{CS}$.

* * * * *